US012675270B2

(12) United States Patent
Herzberg et al.

(10) Patent No.: US 12,675,270 B2
(45) Date of Patent: Jul. 7, 2026

(54) SYSTEMS AND METHODS FOR GENERATING APPLICATION POLICIES

(71) Applicant: Citrix Systems, Inc., Fort Lauderdale, FL (US)

(72) Inventors: Michael Herzberg, Cambridge (GB); Chris Mayers, Histon (GB)

( * ) Notice: Subject to any disclaimer, the term of this patent is extended or adjusted under 35 U.S.C. 154(b) by 378 days.

(21) Appl. No.: 17/854,662

(22) Filed: Jun. 30, 2022

(65) Prior Publication Data

US 2023/0259349 A1     Aug. 17, 2023

Related U.S. Application Data

(60) Provisional application No. 63/309,064, filed on Feb. 11, 2022.

(51) Int. Cl.
*G06F 9/44*         (2018.01)
*G06F 8/65*         (2018.01)
*G06F 8/71*         (2018.01)
(52) U.S. Cl.
CPC . *G06F 8/65* (2013.01); *G06F 8/71* (2013.01)
(58) Field of Classification Search
None
See application file for complete search history.

(56) References Cited

U.S. PATENT DOCUMENTS

| | | | | | |
|---|---|---|---|---|---|
| 8,943,547 | B2 * | 1/2015 | Kazachkov | ........... | G06F 21/552 |
| | | | | | 726/1 |
| 10,243,963 | B1 * | 3/2019 | Benameur | ........... | H04L 63/1408 |
| 2004/0015956 | A1 * | 1/2004 | Barfield | .................... | G06F 8/62 |
| | | | | | 717/174 |
| 2007/0014277 | A1 * | 1/2007 | Ebbesen | ............... | H04L 45/566 |
| | | | | | 370/392 |
| 2007/0245344 | A1 * | 10/2007 | Kumagai | .................. | G06F 8/65 |
| | | | | | 717/174 |
| 2010/0154026 | A1 * | 6/2010 | Chatterjee | ............. | G06F 21/126 |
| | | | | | 726/1 |
| 2016/0088011 | A1 * | 3/2016 | Johri | ........................ | G06F 21/52 |
| | | | | | 726/23 |
| 2017/0206351 | A1 * | 7/2017 | Jay | ...................... | H04W 12/088 |

OTHER PUBLICATIONS

Welch, et al. "Citrix App Layering", Citrix: Product Documentation, Nov. 30, 2022, https://docs.citrix.com/en-us/citrix-app-layering/4.html.
"AaronLocker", Github.com. [retrieved on Mar. 29, 2023] https://github.com/Microsoft/AaronLocker.
"Security", Citrix: Product Documentation, Feb. 21, 2023, https://docs.citrix.com/en-us/workspace-environment-management/current-release/user-interface-description/security.html.

* cited by examiner

*Primary Examiner* — Lanny N Ung

(57)          ABSTRACT

One disclosed method involves causing, by a computing system, installation of at least a first application and a second application, determining, by the computing system, first application data indicative of modifications occurring in response to installation of the first application, determining, by the computing system, second application data indicative of modifications occurring in response to installation of the second application, and processing the first application data and the second application data to generate a set of application policies to control use of the first application and the second application at a user device.

20 Claims, 7 Drawing Sheets

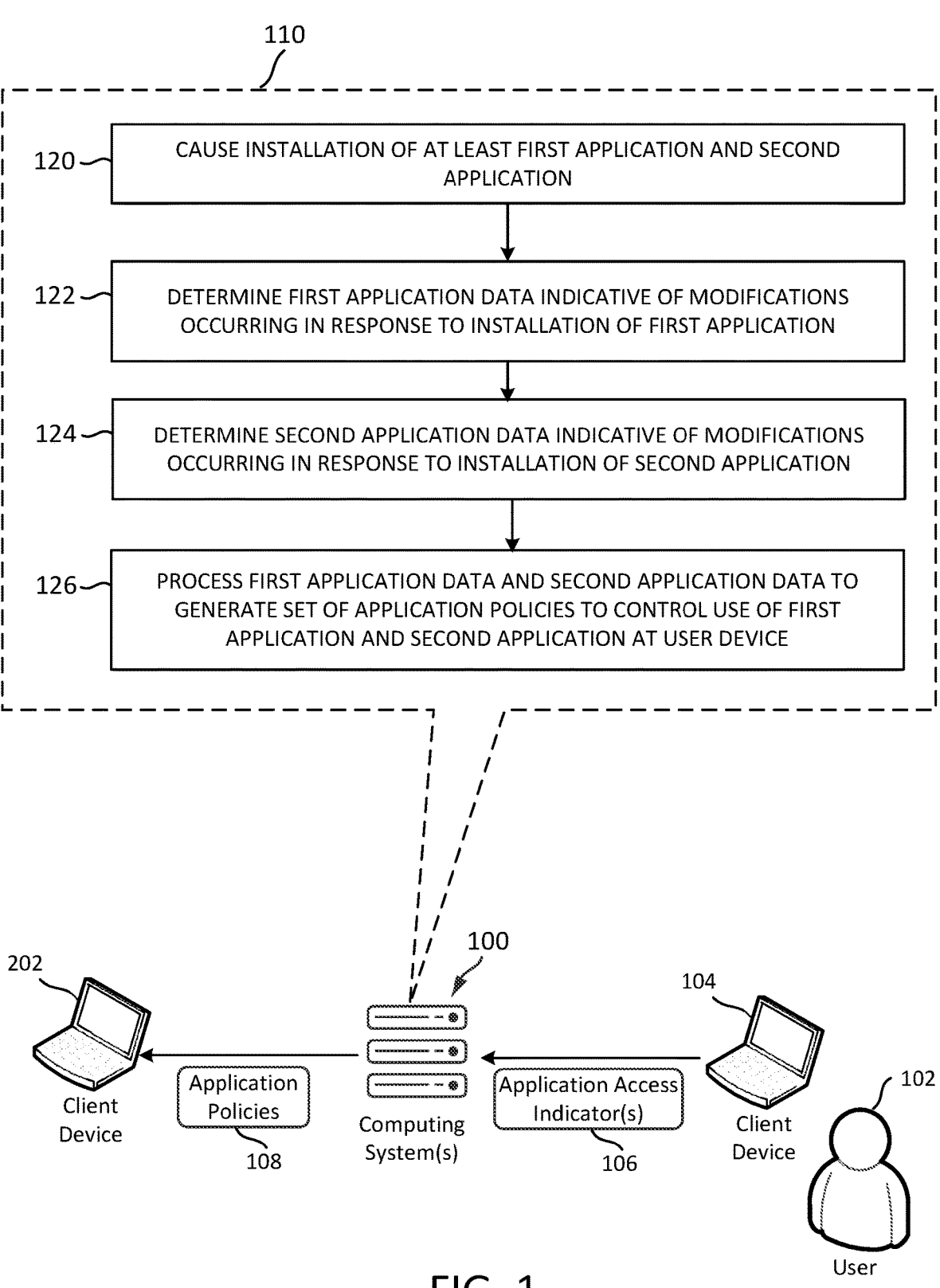

110

120 — CAUSE INSTALLATION OF AT LEAST FIRST APPLICATION AND SECOND APPLICATION

122 — DETERMINE FIRST APPLICATION DATA INDICATIVE OF MODIFICATIONS OCCURRING IN RESPONSE TO INSTALLATION OF FIRST APPLICATION

124 — DETERMINE SECOND APPLICATION DATA INDICATIVE OF MODIFICATIONS OCCURRING IN RESPONSE TO INSTALLATION OF SECOND APPLICATION

126 — PROCESS FIRST APPLICATION DATA AND SECOND APPLICATION DATA TO GENERATE SET OF APPLICATION POLICIES TO CONTROL USE OF FIRST APPLICATION AND SECOND APPLICATION AT USER DEVICE

202

Client Device

Application Policies

108

100

Computing System(s)

Application Access Indicator(s)

106

104

Client Device

102

User

FIG. 1

SYSTEMS AND METHODS FOR GENERATING APPLICATION POLICIES

CROSS-REFERENCE TO RELATED APPLICATION

This application claims the benefit under 35 U.S.C. § 119(e) of U.S. Provisional Patent Application No. 63/309,064, filed Feb. 11, 2022, and entitled SYSTEMS AND METHODS FOR GENERATING APPLICATION POLICIES, the entire contents of which are incorporated herein by reference for all purposes.

BACKGROUND

Various systems have been developed that allow client devices to access applications. Application control is a security mechanism that limits the programs a user can use. Application control is an important security mechanism to protect against malware and related security threats on user devices, such as laptops, desktops, virtual desktops, etc.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method may involve causing, by a computing system, installation of at least a first application and a second application, determining, by the computing system, first application data indicative of modifications occurring in response to installation of the first application, determining, by the computing system, second application data indicative of modifications occurring in response to installation of the second application, and processing the first application data and the second application data to generate a set of application policies to control use of the first application and the second application at a user device.

In some disclosed embodiments, a system may comprise at least one processor, and at least one computer-readable medium encoded with instructions which, when executed by the at least one processor, cause the system to cause installation of at least a first application and a second application, determine first application data indicative of modifications occurring in response to installation of the first application, determine second application data indicative of modifications occurring in response to installation of the second application, and process the first application data and the second application data to generate a set of application policies to control use of the first application and the second application at a user device.

In some disclosed embodiments, at least one non-transitory, computer-readable medium may be encoded with instructions which, when executed by at least one processor included in a system, cause the system to cause installation of at least a first application and a second application, determine first application data indicative of modifications occurring in response to installation of the first application, determine second application data indicative of modifications occurring in response to installation of the second application, and process the first application data and the second application data to generate a set of application policies to control use of the first application and the second application at a user device.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 1 shows an example implementation of a system for generating application policies, in accordance with some embodiments of the present disclosure;

DETAILED DESCRIPTION

Figure 2:
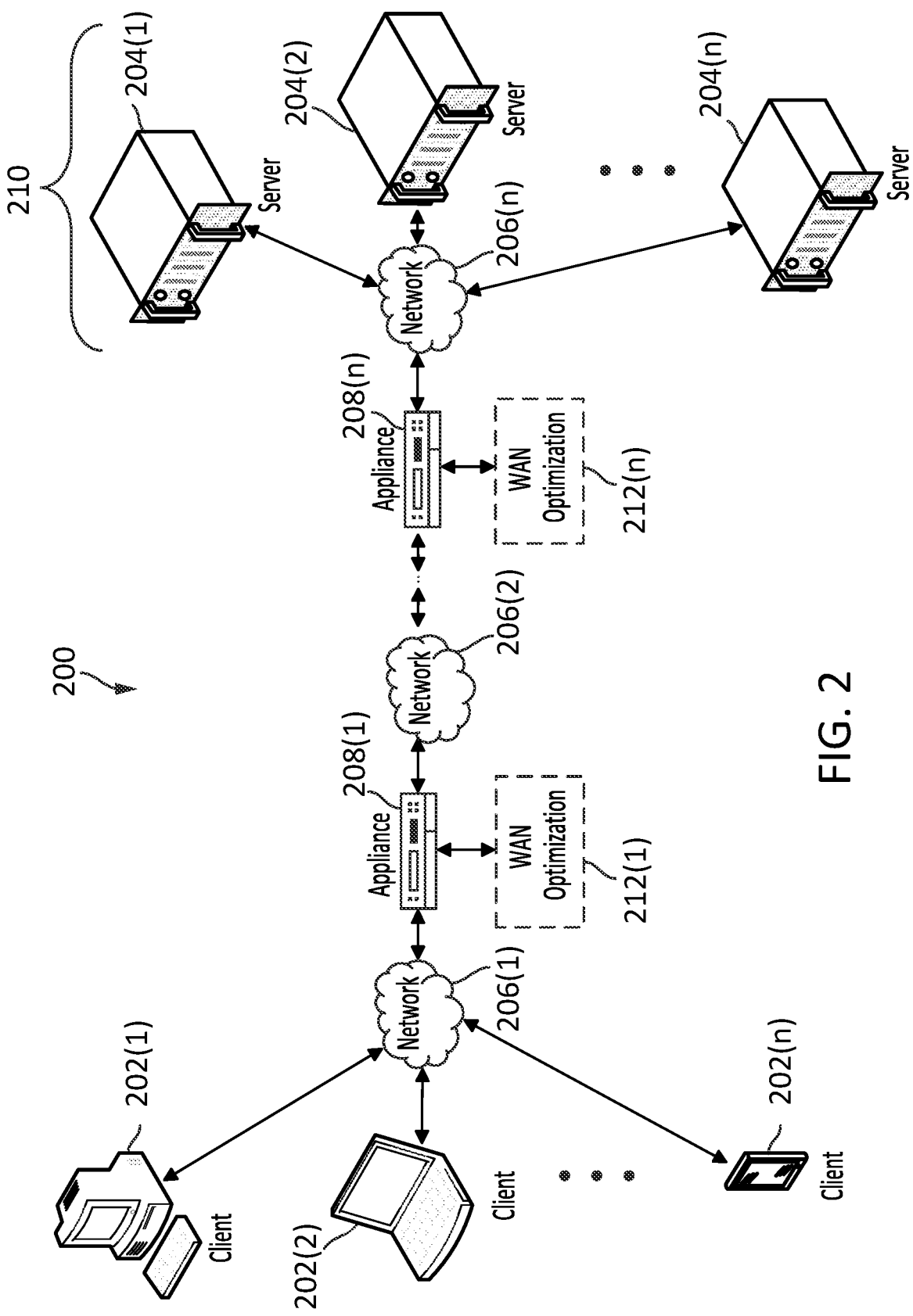
FIG. 2 is a diagram of a network environment in which some embodiments of the novel systems and methods disclosed herein may be deployed.

A computing device, such as a desktop, a laptop, a virtual desktop, or the like, may have multiple applications installed thereon. Application control is a security mechanism that limits the applications that users can use. As used herein, an application refers to a software/computer program designed to carry out a specific task other than one relating to the operation of the computer itself (e.g., an operating system), and typically used by end-users. As used herein, an application policy refers to a rule or other similar construct that is used to control operations by an application, where such operations can involve an application opening/launching at a computing device, an application being used to open/access a file/data, an application being installed at a computing device, and the like.

An example of an application control mechanism is AppLocker provided by Microsoft for use with Windows-based operating systems. AppLocker functions to restrict the usage of particular programs. AppLocker lets administrators control which executable files are denied or allowed to run at a computing device. Administrators are able to manually generate rules based on file names, publishers or file locations on unique identities of files and specify which users or group of users can execute (or not execute) those applications.

An organization or user may want to control the types of application that can be used at a user device, in particular, preventing use/installation of applications that are a high risk for commercial, security, or privacy reasons. For example, certain types of games may be disapproved for compliance risks, portable document format (PDF) tools may be disapproved for security/vulnerability risk, and certain applications that are no longer supported may be disapproved for security/vulnerability risk.

However, generating application policies to effectively perform application control is a difficult task. This is due, in part, to the fact that large organizations may require hundreds or even thousands of applications, and many applications may include components that are shared with other applications. Moreover, applications may be frequently updated by vendors/publishers, and an update could change the application policy necessary to control the application. Additionally, different groups of users may require different groups of applications and/or different application policies.

Offered are techniques for generating application policies by monitoring individual application installations, optimizing a set of application policies by combining policies/rules, and generating modular application policies by dividing up resulting rulesets. In some embodiments, multiple applications may be installed at a computing system, and the computing system may determine application data indicative of modifications occurring in response to installation of the individual applications. The computing system may then process the application data for the multiple applications to generate a set of application policies to control use of the individual applications at a user device.

The techniques of the present disclosure may provide, among other things, some or all of the following improvements: (1) a reference machine configuration, with all applications of interest installed thereon, is not required; (2) deployment of exceptions using a modular policy is enabled; and (3) application policies for new and updated applications can be generated.

The techniques of the present disclosure may be used to generate application policies to control application use/access at particular types of computing devices, such as a desktop, a laptop, a virtual desktop or the like. Similar techniques may be used to generate application policies to control application use/access at other types of computing devices, such as a smartphone, a tablet, a smartwatch, a smart speaker, etc., if such devices support application control using application policies.

For purposes of reading the description below of the various embodiments, the following descriptions of the sections of the specification and their respective contents may be helpful:

Section A provides an introduction to example embodiments of a system for generating application policies;
Section B describes a network environment which may be useful for practicing embodiments described herein;
Section C describes a computing system which may be useful for practicing embodiments described herein;
Section D describes embodiments of systems and methods for accessing computing resources using a cloud computing environment;
Section E describes an example architecture of a resource virtualization server;

Section F provides a more detailed description of example embodiments of the system for generating application policies introduced in Section A; and
Section G describes example implementations of methods, systems/devices, and computer-readable media in accordance with the present disclosure.

A. Introduction to Illustrative Embodiments of a System for Generating Application Policies FIG. 1 shows an example configuration with which some aspects of the present disclosure may be implemented. One or more computing systems 100 may be configured to monitor installation of applications for which application policies are to be generated, and generate application policies based on monitoring the application installation.

As shown in FIG. 1, the computing system(s) 100 may be in communication with a client device 104 operated by a user 102, who may be an administrator responsible for generating application policies for one or more end user-devices. In some implementations, the computing system(s) 100 may also be in communication with a client device 202, which may be an end-user device that is use the generated application policies. The computing system(s) 100 may be in communication with the client devices 104, 202 via one or more networks 206 (shown in FIG. 2). The computing system(s) 100 may be implemented by one or more servers 204. Examples of components that may be used to implement the client device 104, 202 and the servers 204, as well as examples of computing environments in which such components may be deployed, are described below in connection with FIGS. 2-4. In some implementations, the client/user device 202 may access virtual applications or a virtual desktop provided by a resource virtualization server 502 described below in connection FIG. 5, where the virtual application or virtual desktop may be subjected to the application policies that are generated as described herein. In some implementations, the computing system(s) 100 may be a virtual machine(s) or virtual computing system(s).

In some implementations, the computing system(s) 100 may perform a routine 110 shown in FIG. 1. At a step 120 of the routine 110, the computing system(s) 100 may cause installation of at least a first application and a second application. The first and second application may be installed individually/separately (i.e. at separate times) so that installation can be monitored for the respective applications. For example, the second application may be installed after the first application installation is completed. In some implementations, more than one computing system/virtual machine may be used to install the first and second applications. In such implementations, the first and second applications may be installed in parallel, for example, the first application may be installed at a first computing system/virtual machine, and the second application may be installed at a second computing system/virtual machine, where the respective computing systems/virtual machines may monitor installation of their respective applications.

At a step 122 of the routine 110, the computing system(s) 100 may determine first application data indicative of modifications occurring in response to installation of the first application. When an application is installed at a device, some changes may be made at the device, such as files and other data needed to run the application may be saved to the device, or files or other data already stored at the device may be modified. Other changes may also be made at the device to enable execution of the application. The computing system(s) 100 may record changes (e.g., files and data stored or modified) that are made to the computing system(s) 100 in response to installing the first application, and the first application data may indicate these changes.

At a step 124 of the routine 110, the computing system(s) 100 may determine second application data indicative of modifications occurring in response to installation of the second application. Similar to the step 122, the computing system(s) 100 may record changes (e.g., files and data stored or modified) that are made to the computing system(s) 100 in response to installing the second application, and the second application data may indicate these changes.

At a step 126 of the routine 110, the computing system(s) 100 may process the first application data and the second application data to generate a set of application policies to control use of the first application and the second application at the client/user device 202. The computing system(s) 100 may receive one or more application access indicators 106 from the client device 104. The application access indicator(s) 106 may indicate whether a particular application is authorized or unauthorized for the client/user device 202. An authorized application may be enabled to run/execute (e.g., enable a user to view files, modify files, etc.) at the client/user device 202. An unauthorized application may be disabled from running/executing at the client/user device 202. In an example, the application access indicators 106 may include a first indicator representing that the first application is authorized and a second indicator representing that the second application is authorized. Using the first and second application data, and the application access indicator(s) 106, the computing system(s) 100 may generate the set of application policies 108.

In some implementations, the computing system(s) 100 may, using the first application data, generate a first application policy to control access of the first application. The first application policy may be based on the modifications indicated in the first application data. For example, the first application data may indicate that a first file is stored when the first application is installed, and the first application policy may indicate that the first file is allowed to execute. Similarly, the computing system(s) 100 may, using the second application data, generate a second application policy to control access of the second application.

Using the first and second application policies, the computing system(s) 100 may generate an optimized set of application policies 108. In generating the optimized set of application policies 108, the computing system(s) 100 may eliminate duplicate policies and may resolve conflicts between policies. For example, execution of the first and second applications may involve use of the same file/data, which may result in the first and second application policies including duplicative rules. To reduce the number of rules in the application policies 108, the computing system(s) 100 may delete one or more of the rules, which reduces the amount of processing that the client/user device 202 has to perform in enforcing application control. In another example, if the first application is authorized and the second application is unauthorized, and execution of the first and second applications involve use of the same file/data, then the first and second application policies may be in conflict. Keeping both of the first and second application policies may result in blocking/disabling of the authorized first application, or may result in allowing/enabling of the unauthorized second application. To avoid this outcome, the computing system(s) 100 may resolve the conflict between the first and second application policies, so that the authorized first application is enabled and the unauthorized second application is disabled.

The application policies 108 may be deployed at the client/user device 202 (e.g., the computing system(s) 100 may send the application policies 108 to the client/user device 202) to enforce application control for the first and second applications. In example implementations, the application policies 108 may be enforced at the client/user device 202 by AppLocker.

In a similar manner as described above, the computing system(s) 100 may monitor installation of multiple applications, and may generate the application policies 108 to control use of the multiple applications at the client/user device 202.

Additional details and example implementations of embodiments of the present disclosure are set forth below in Section F, following a description of example systems and network environments in which such embodiments may be deployed.

B. Network Environment

Referring to FIG. 2, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one of more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, FL, such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VOIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

In some embodiments, one or more of the appliances 208, 212 may be implemented as products sold by Citrix Systems, Inc., of Fort Lauderdale, FL, such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of an organization.

C. Computing Environment

Figure 3:
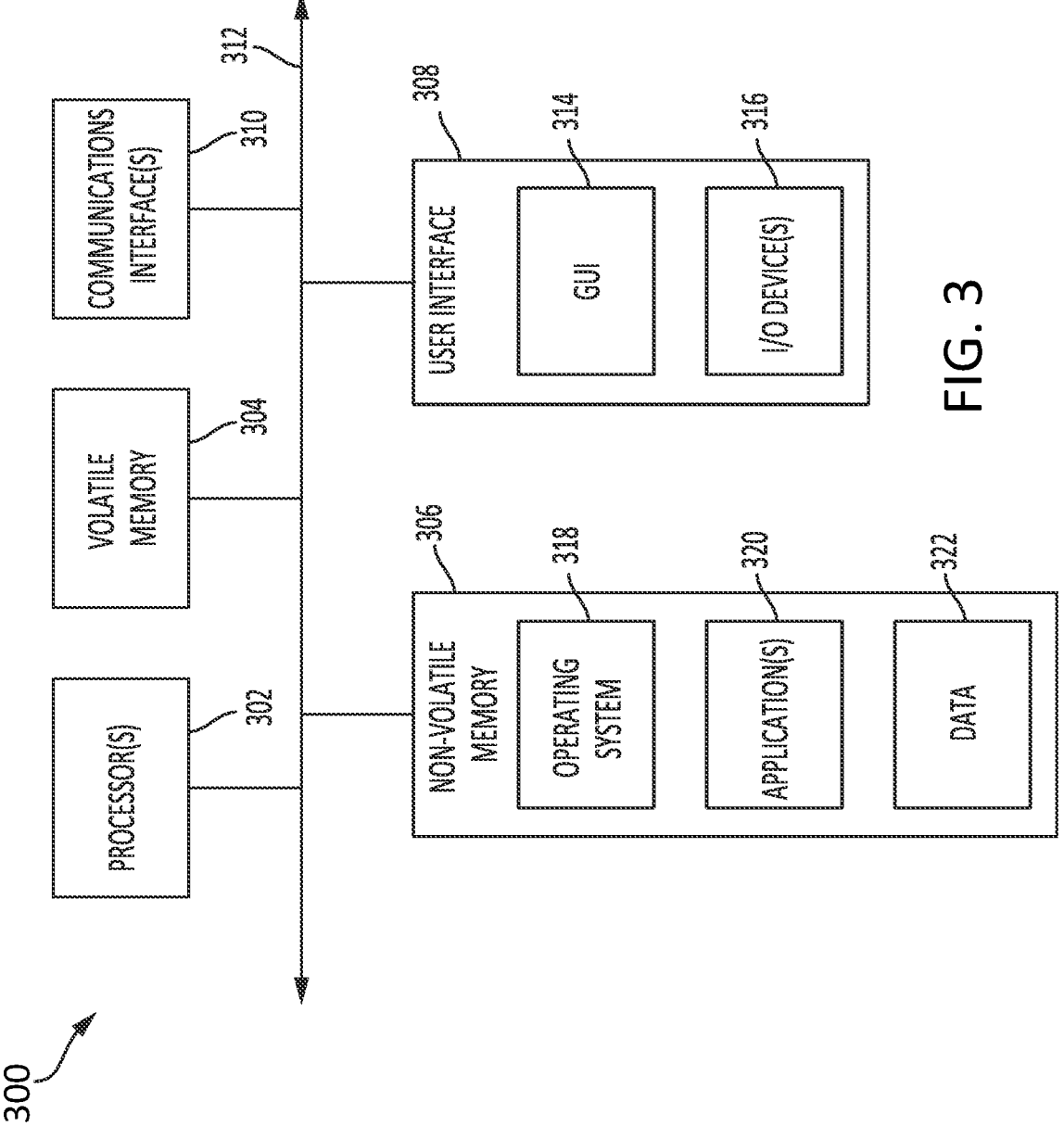
FIG. 3 is a block diagram of a computing system that may be used to implement one or more of the components of the computing environment shown in FIG. 2 in accordance with some embodiments.
Figure 4:
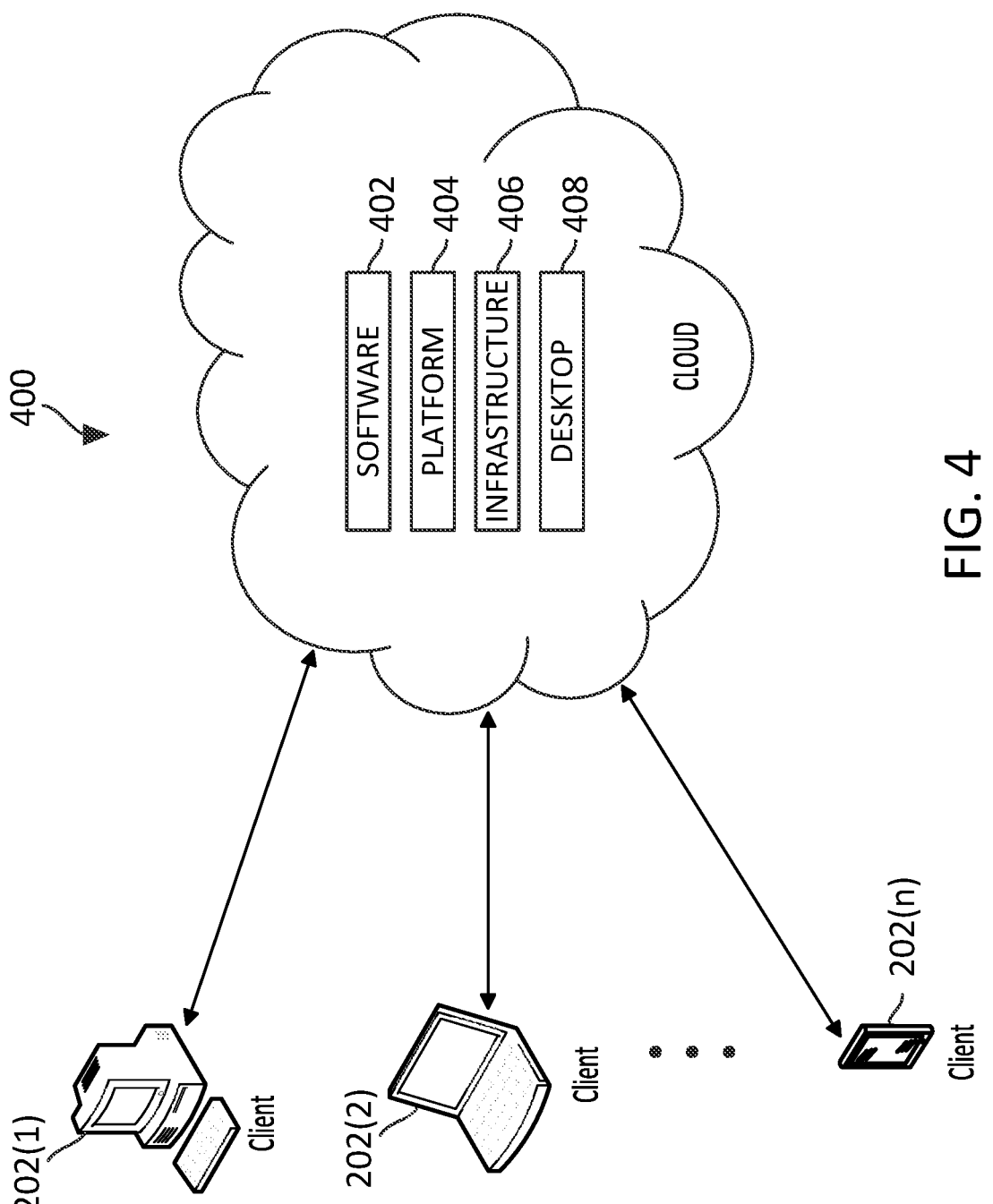
FIG. 4 is a schematic block diagram of a cloud computing environment in which various aspects of the disclosure may be implemented.

FIG. 3 illustrates an example of a computing system 300 that may be used to implement one or more of the respective components (e.g., the clients 202, the servers 204, the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

D. Systems and Methods for Delivering Shared Resources Using a Cloud Computing Environment Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 202 (such as those described in connection with FIG. 2) are in communication with a cloud network 404. The cloud network 404 may include back-end platforms, e.g., servers, storage, server farms and/or data centers. The clients 202 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 400 may provide a hybrid cloud that is a combination of a public cloud and one or more resources located outside such a cloud, such as resources hosted within one or more data centers of an organization. Public clouds may include public servers that are maintained by third parties to the clients 202 or the enterprise/tenant. The servers may be located off-site in remote geographical locations or otherwise. In some implementations, one or more cloud connectors may be used to facilitate the exchange of communications between one more resources within the cloud computing environment 400 and one or more resources outside of such an environment.

The cloud computing environment 400 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 202. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. Citrix Files from Citrix Systems, DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure, such as AZURE CLOUD from Microsoft Corporation of Redmond, Washington, or AMAZON WEB SERVICES provided by Amazon.com, Inc., of Seattle, Washington, for example. In the case of Citrix Cloud, Citrix Workspace app may be used as a single-entry point for bringing apps, files and desktops together (whether on-premises or in the cloud) to deliver a unified experience.

E. Example Architecture of a Resource Virtualization Server

Figure 5:
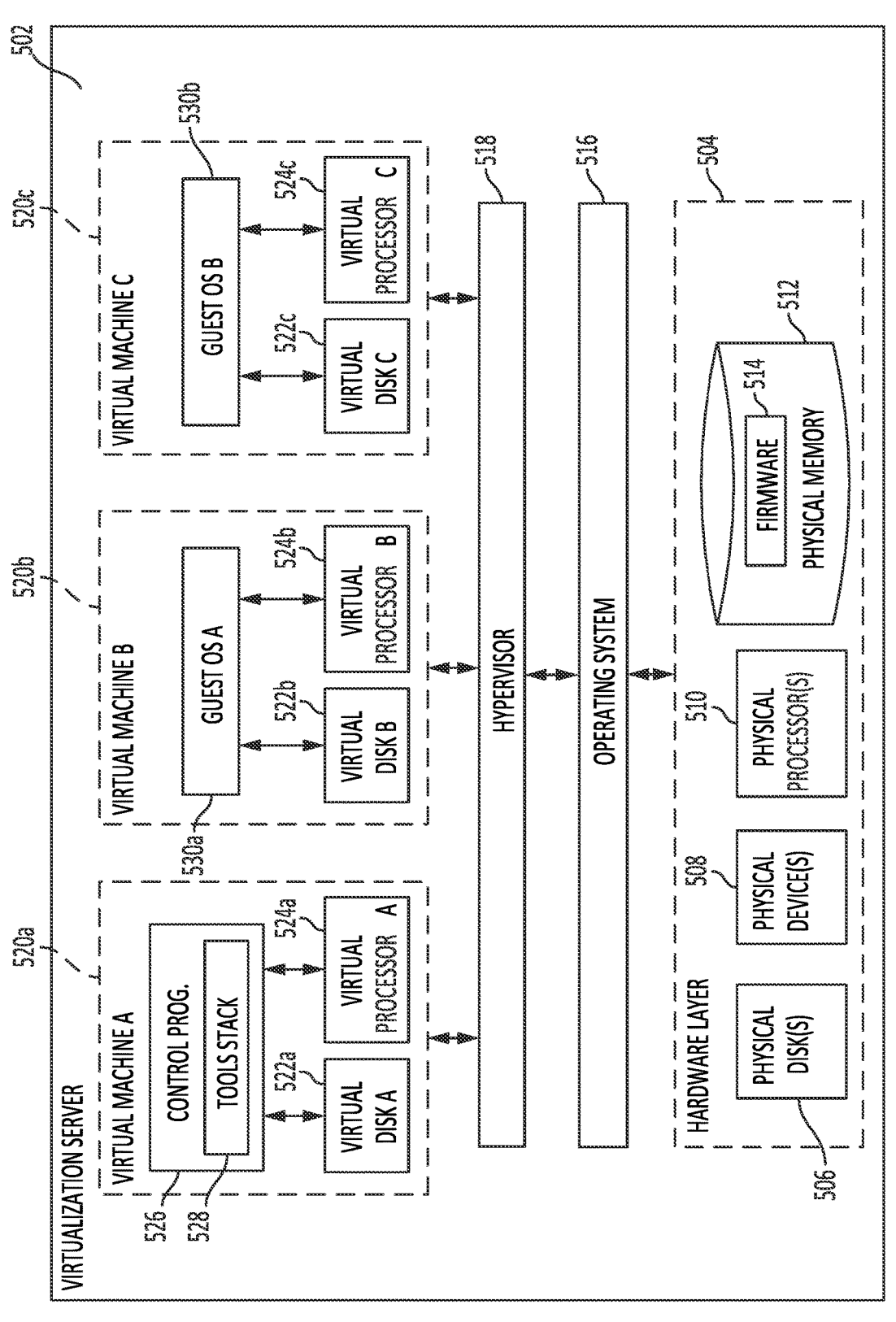
FIG. 5 depicts an illustrative virtualized (hypervisor) system architecture that may be used in accordance with one or more illustrative aspects described herein.

FIG. 5 shows an example architecture of an illustrative resource virtualization server 502. As shown, the resource virtualization server 502 may be configured to provide virtual desktops and/or virtual applications to one or more client access devices, such as the clients 202. As used herein, a desktop may refer to a graphical environment (e.g., a graphical user interface) or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Instances of the operating system may be physical (e.g., one operating system per physical device) or virtual (e.g., many instances of an OS running on a single physical device). The applications may be executed on a local device, or executed on a remotely located device (e.g., remoted).

The virtualization server 502 illustrated in FIG. 5 may be deployed as and/or implemented by one or more of the servers 204 described above, the servers that make up a virtualization server system, or by other known computing devices. Included in the virtualization server 502 is a hardware layer 504 that may include one or more physical disks 506, one or more physical devices 508, one or more physical processors 510, and one or more physical memories 512. In some embodiments, firmware 514 may be stored within a memory element in physical memory 512 and be executed by one or more of the physical processors 510. The virtualization server 502 may further include an operating system 516 that may be stored in a memory element in physical memory 512 and executed by one or more of physical processors 510. Still further, a hypervisor 518 may be stored in a memory element in the physical memory 512 and be executed by one or more of the physical processors 510. Presence of the operating system 516 may be optional such as in a case where the hypervisor 518 is a Type 1 hypervisor; that is, a bare-metal hypervisor installed directly on the hardware layer 504. In some implementations, the hypervisor 518 may be a Type 2 hypervisor, which executes on a host operating system, such as the OS 516, which may provide virtualization services such as I/O device support and memory management.

Executing on one or more of the physical processors 510 may be one or more virtual machines 520a-c (generally 520). The virtual machines 520 may have respective virtual disks 522a-c and virtual processors 524a-c. In some embodiments, a first virtual machine 520a may execute, using the virtual processor 524a, a control program 526 that includes a tools stack 528. The control program 526 may be referred to as a control virtual machine, Domain 0, Dom0, or other virtual machine used for system administration and/or control. In some embodiments, one or more of the virtual machines 520b-c may execute, using a virtual processor 524b-c, a guest operating system 530a-b (generally 530).

The physical devices 508 may include, for example, a network interface card, a video card, an input device (e.g., a keyboard, a mouse, a scanner, etc.), an output device (e.g., a monitor, a display device, speakers, a printer, etc.), a storage device (e.g., an optical drive), a Universal Serial Bus (USB) connection, a network element (e.g., router, firewall, network address translator, load balancer, virtual private network (VPN) gateway, Dynamic Host Configuration Protocol (DHCP) router, etc.), or any device connected to or communicating with virtualization server 502. The physical memory 512 in hardware layer 504 may include any type of memory. The physical memory 512 may store data, and in some embodiments may store one or more programs, or set of executable instructions. FIG. 5 illustrates an embodiment where firmware 514 is stored within physical memory 512 of virtualization server 502. Programs or executable instructions stored in physical memory 512 may be executed by the one or more of the processors 510 of the virtualization server 502.

The virtualization server 502 may also include hypervisor 518. In some embodiments, the hypervisor 518 may be a program executed by processors 510 on the virtualization server 502 to create and manage any number of virtual machines 520. The hypervisor 518 may be referred to as a virtual machine monitor, or platform virtualization software. In some embodiments, the hypervisor 518 may be any combination of executable instructions and hardware that monitors virtual machines 520 executing on a computing machine. The hypervisor 518 may be a Type 2 hypervisor, where the hypervisor executes within operating system 516 executing on virtualization server 502. The virtual machines may then execute at a layer above hypervisor 518. In some embodiments, the Type 2 hypervisor may execute within the context of a user's operating system such that the Type 2 hypervisor interacts with the user's operating system. In other embodiments, one or more virtualization servers 502 in a virtualization environment may instead include a Type 1 hypervisor (not shown). A Type 1 hypervisor may execute on the virtualization server 502 by directly accessing the hardware and resources within hardware layer 504. That is, while the Type 2 hypervisor 518 accesses system resources through host operating system 516, as shown, a Type 1 hypervisor may directly access all system resources without host operating system 516. A Type 1 hypervisor may execute directly on one or more physical processors 510 of the virtualization server 502, and may include program data stored in the physical memory 512.

The hypervisor 518, in some embodiments, may provide virtual resources to the guest operating systems 530 or control programs 526 executing on virtual machines 520 in any manner that simulates the operating systems 530 or control programs 526 having direct access to system resources. System resources may include, but are not limited to, the physical devices 508, the physical disks 506, the physical processors 510, physical memory 512, and any other component included in the hardware layer 504 of the virtualization server 502. The hypervisor 518 may be used to emulate virtual hardware, partition physical hardware, virtualize physical hardware, and/or execute virtual machines that provide access to computing environments. In still other embodiments, the hypervisor 518 may control processor scheduling and memory partitioning for the virtual machine 520 executing on the virtualization server 502. Examples of hypervisor 518 may include those manufactured by VMWare, Inc., of Palo Alto, California; Xen Project® hypervisor, an open source product whose development is overseen by the open source XenProject.org community; Hyper-V®, Virtual Server®, and Virtual PC® hypervisors provided by Microsoft Corporation of Redmond, Washington; or others. In some embodiments, the virtualization server 502 may execute a hypervisor 518 that creates a virtual machine platform on which the guest operating systems 530 may execute. In these embodiments, the virtualization server 502 may be referred to as a host server. An example of such a virtualization server is Citrix Hypervisor® provided by Citrix Systems, Inc., of Fort Lauderdale, Florida.

The hypervisor 518 may create one or more virtual machines 520*b-c* (generally 520) in which guest operating systems 530 execute. In some embodiments, the hypervisor 518 may load a virtual machine image to create a virtual machine 520. The virtual machine image may refer to a collection of data, states, instructions, etc. that make up an instance of a virtual machine. In other embodiments, the hypervisor 518 may execute guest operating system 530 within the virtual machine 520. In still other embodiments, the virtual machine 520 may execute the guest operating system 530.

In addition to creating the virtual machines 520, the hypervisor 518 may control the execution of at least one virtual machine 520. In other embodiments, the hypervisor 518 may present at least one virtual machine 520 with an abstraction of at least one hardware resource provided by the virtualization server 502 (e.g., any hardware resource available within hardware layer 504). In other embodiments, the hypervisor 518 may control the manner in which the virtual machines 520 access physical processors 510 available in the virtualization server 502. Controlling access to the physical processors 510 may include determining whether the virtual machine 520 should have access to the processor 510, and how physical processor capabilities are presented to the virtual machine 520.

As shown in FIG. 5, the virtualization server 502 may host or execute one or more virtual machines 520. A virtual machine 520 may be a set of executable instructions and/or user data that, when executed by processor 510, may imitate the operation of a physical computer such that the virtual machine 520 may execute programs and processes much like a physical computing device. While FIG. 5 illustrates an embodiment where the virtualization server 502 hosts three virtual machines 520, in other embodiments the virtualization server 502 may host any number of virtual machines 520. The hypervisor 518, in some embodiments, may provide the virtual machines 520 with unique virtual views of the physical hardware, including the memory 512, the processor 510, and other system resources 506, 508 available to the respective virtual machines 520. In some embodiments, the unique virtual view may be based on one or more of virtual machine permissions, application of a policy engine to one or more virtual machine identifiers, a user accessing a virtual machine, the applications executing on a virtual machine, networks accessed by a virtual machine, or any other desired criteria. For instance, the hypervisor 518 may create one or more unsecure virtual machines 520 and one or more secure virtual machines 520. The unsecure virtual machines 520 may be prevented from accessing resources, hardware, memory locations, and programs that the secure virtual machines 520 may be permitted to access. In other embodiments, the hypervisor 518 may provide the virtual machines 520 with substantially similar virtual views of the physical hardware, memory, processor, and other system resources available to the virtual machines 520.

The virtual machines 520 may include respective virtual disks 522*a-c* (generally 522) and virtual processors 524*a-c* (generally 524.) The virtual disk 522, in some embodiments, may be a virtualized view of one or more physical disks 506 of the virtualization server 502, or a portion of one or more physical disks 506 of the virtualization server 502. The virtualized view of the physical disks 506 may be generated, provided, and managed by the hypervisor 518. In some embodiments, the hypervisor 518 may provide the virtual machines 520 with unique views of the physical disks 506. Thus, in these embodiments, a particular virtual disk 522 included in a respective virtual machine 520 may be unique when compared with other virtual disks 522.

The virtual processor 524 may be a virtualized view of one or more physical processors 510 of the virtualization server 502. In some embodiments, the virtualized view of physical processors 510 may be generated, provided, and managed by the hypervisor 518. In some embodiments, the virtual processor 524 may have substantially all of the same characteristics of at least one physical processor 510. In other embodiments, the virtual processor 510 may provide a modified view of the physical processors 510 such that at least some of the characteristics of the virtual processor 524 are different from the characteristics of the corresponding physical processor 510.

Figure 6:
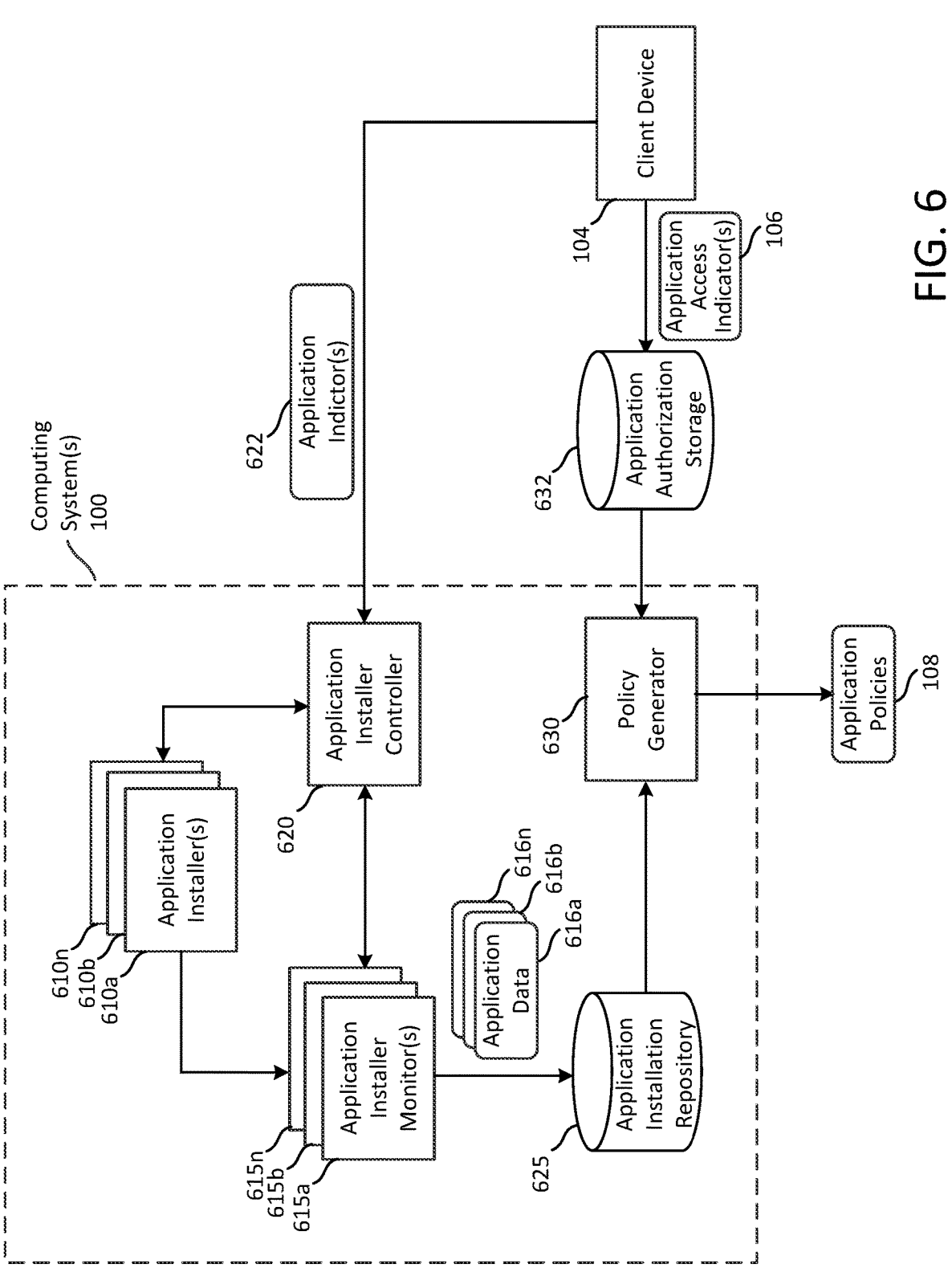
FIG. 6 is a block diagram illustrating example components of one or more computing systems, shown in FIG. 1, for generating application policies.

F. Detailed Description of Example Embodiments of the System for Generating Application Policies Introduced in Section A As described in Section A above, the present disclosure relates to techniques for monitoring installation of applications and generating application policies to control use of the applications at a user device. FIG. 6 is a block diagram illustrating example components that may be used to implement the functionalities described herein. As shown in FIG. 6, in some implementations, the computing system(s) 100 may include one or more application installers 610, an application installer controller 620, one or more application installer monitors 615, and a policy generator 630. The computing system(s) 100 may also include or may be in communication with an application installation repository 625. Other implementations may include different configurations of the components shown in FIG. 6 as described below.

In some implementations, the computing system(s) 100 may include one or more processors (e.g., processors 302 shown in FIG. 3) as well as one or more computer-readable mediums (e.g., volatile memory 304 and non-volatile memory 306 shown in FIG. 3) that are encoded with instructions to be executed by the processor(s). In some implementations, such instructions may cause the processor(s) to implement one or more, or possibly all, of the operations of the computing system(s) 100 described herein.

The application policies 108, generated by the computing system(s) 100, may be enforced at the client device 202 (shown in FIG. 1) by an application control mechanism. An example of such an application control mechanism is AppLocker provided by Microsoft for use with Windows-based operating systems. Another example of an application control mechanism is Google Santa provided by Google, Alphabet Inc. Google Santa is a service for allowing or blocking use of applications within Mac OSX. Yet another example of an application control mechanism is Citrix Workspace Environment Manager provided by Citrix Systems Inc. Based on the client device 202 configuration (e.g., operating system, platform, etc.), an appropriate one of such application control mechanisms, or a different application control mechanism, may be used.

The application installer monitor(s) 615 may be one or more virtual machines configured to monitor installation of an application at the virtual machine(s). In some implementations, the computing system(s) 100 may include multiple virtual machines/application installer monitors 615, each to be used to install a different application. For example, the computing system(s) 100 may include eight virtual machines/application installer monitors 615, which may operate in parallel to install applications and generate application data 616 indicative of modifications made during installation of the respective applications. In other implementations, rather than using application installer monitors 615 as virtual machines, containers could be used for compatible application installers 610.

An individual application installer 610 may be an installer for a particular application that is to be evaluated for generating an application policy. Such application installer 610 may be provided by a publisher, vendor, or other provider of an application. For example, a first application installer 610a may be configured to install a first application. In some implementations, the application installers 610, for the individual applications to be evaluated, may be downloaded/stored at the computing system(s) 100. In some implementations, the application installers 610 may be downloaded/stored at the application installer monitor(s) 615. In other implementations, the application installer monitor(s) 615 may communicate with the application installer(s) 610 to initiate installation of applications, where the application installer(s) 610 may be provided at computing system(s)/server(s) outside/external to the computing system(s) 100.

The application installer controller 620 may be configured to schedule and initiate installation of applications at the application installer monitors 615. The application installer controller 620 may be configured to function as a job scheduler and orchestrator. In some implementations, the application installer controller 620 may receive, from the client device 104 (or another device) one or more application indicators 622 indicative of which applications are to be evaluated for generating application policies, and based on the application indicator(s) 622, the application installer controller 620 may communicate with or retrieve the appropriate application installers 610. The application installer controller 620 may then schedule jobs to install the individual applications, in parallel, at the application installer monitor(s) 615. For example, the application installer controller 620 may schedule and initiate a first job to install a first application using the first application installer 610a at the first application installer monitor 615a, may schedule and initiate a second job to install a second application using the second application installer 610b at the second application installer monitor 615b, and so on. Thus, applications may be installed in parallel at the multiple application installer monitors 615. The application installer controller 620 may schedule further jobs that may be initiated after an application installation is completed at the application installer monitors 615. For example, the application installer controller 620 may schedule a third job to install a third application using the third installer 610c at the first application installer monitor 615a after the first job is completed.

An individual application installer monitor 615 may generate application data 616 indicative of the modifications made at the application installer monitor 615 when installing an application. When an application is installed at a device, one or more changes may occur at the device. For example, files and other data may be stored at the device to enable execution of the application. As another example, files and data already stored at the device may be modified to enable execution of the application. The application installer monitor 615 may record such modifications in the application data 616. In some implementations, the application installer monitor 615 may ignore certain changes that occur in installing an application, such as changes from operating system (e.g., Windows) updates, and updates from the operating system (e.g., Windows) store, which may coincidentally occur while the application installer 610 is running.

The application data 616 may be a list of changes made at the application installer monitor 615 in installing the application. For example, the application data 616 may include a list of files stored or modified at the application installer monitor 615 by the application installer 610, where the files may be identified using a filename and file path/location of where the file is stored.

In some implementations, the application data 616 may include the changes in a form suitable for use by one or more application control mechanisms, for example, AppLocker, Google Santa, Workspace Environment Manager, etc. In some implementations, the application data 616 may also include information (e.g., name, version number, location, size, publisher, etc.) about the respective application installer 610 used to install the application. In some implementations, the application data 616 may also include information about the installation (e.g., time it took to install the application, amount of data stored/modified, etc.).

The application data 616, relating to individual installations of applications, may be stored at the application installation repository 625. For example, first application data 616a may be stored at the application installation repository 625 based on installation of the first application, second application data 616b may be stored at the application installation repository 625 based on installation of the second application, and so on.

After an application (e.g., a first application) has been installed at the application installer monitor 615, the application installer monitor 615 may be reset (e.g., memory and operating system may be restored to original, files/data relating to installation of the application may be deleted, etc.). Such reset may occur after the application installer monitor 615 provided/stored the application data 616 at the application installation repository. After the application installer monitor 615 has been reset, installation of another application (e.g., a second application) may be initiated at the application installer monitor 615.

For applications that are extensions to other applications (e.g., Microsoft Office add-ins), the state of the application installer monitor 615 may be saved after installation of the base application. That is, in such cases, the application installer monitor 615 may not be reset before installing the next extension application.

An individual application installer monitor 615 may process new and updated versions of applications whenever the corresponding application installer 610 is available. The application installer controller 620 may schedule a job for installing new and updated versions of applications, which may result in new/updated application data 616 for an application, which in turn may cause the policy generator 630 to generate new/updated application policies 108.

In some implementations, the application installer monitor(s) 615 may be configured to perform one or more actions in response to an application installer 610 failing, generating an error during installing an application, or otherwise being unsuccessful in installing an application at the application installer monitor(s) 615. For example, the application installer monitor(s) 615 may send an indication to the application installer controller 620 that a job failed, and in turn the application installer controller 620 may reschedule the job (to install the application) so that another attempt at installing the application is performed. As another example, the application installer controller 620 may attempt to find another (e.g., different version) application installer 610 for the application.

In some implementations, certain application installers 610 may need access to the Internet while installing an application, and the application installer monitor(s) 615 may enable such a connection. There may also be additional or other prerequisites for the application installer 610 to install the application, and the application installer monitor(s) 615 may take actions to satisfy such prerequisites. Such actions may be recorded as part of the application data 616.

Once the application data 616 relating to all the applications to be evaluated is stored at the application installation repository 625, the policy generator 630 may process the application data 616 to generate the application policies 108. The policy generator 630 may retrieve the application access indicator(s) 106 from an application authorization storage 632. The client device 104 may provide the application access indicator(s) 106 representing which of the applications (installed and monitored by the application installer monitors 615) are authorized and which are unauthorized, and the application access indicator(s) 106 may be stored in the application authorization storage 632. The application access indicators 106 may include an application name and/or other application identifying data (e.g., publisher information, version number, etc.) along with an authorized indicator or an unauthorized indicator. The application access indicator(s) 106 may be provided via a user interface at the client device 104, and may be provided as a list by inputting text, by selecting graphical user interface elements, or via other types of inputs.

The policy generator 630 may be configured to process the application data 616 and the application access indicator(s) 106 to generate the application policies 108. In some implementations, the policy generator 630 may be implemented at a separate computing system than the application installer monitor(s) 615. The policy generator 630 may generate an optimized set of application policies 108 that can be deployed to enforce application control for the applications at the client device 202.

In some implementations, the policy generator 630 may generate one or more policies for individual applications using the corresponding application data 616. For example, the policy generator 630 may generate one or more first policies for accessing the first application, one or more second policies for accessing the second application, and so on. The policy generator 630 may include data representing policy configuration settings to generate the individual policies. In some implementations, the policy configuration settings may include (1) a set of regular expressions that match file paths which are "unstable" (e.g., the file path contains version numbers or contains a random universally unique identifier (UUID) that is generated at install time, etc.), (2) a set of regular expressions that match paths of files which have "malformed" publisher information (e.g., a product name that also contains a version number), and (3)

whether an application is a "framework application." A framework application refers to related applications, such as Microsoft Office applications (e.g., Microsoft Word, Microsoft Excel, etc.), which are likely to conflict with each other because they are related.

Figure 7:
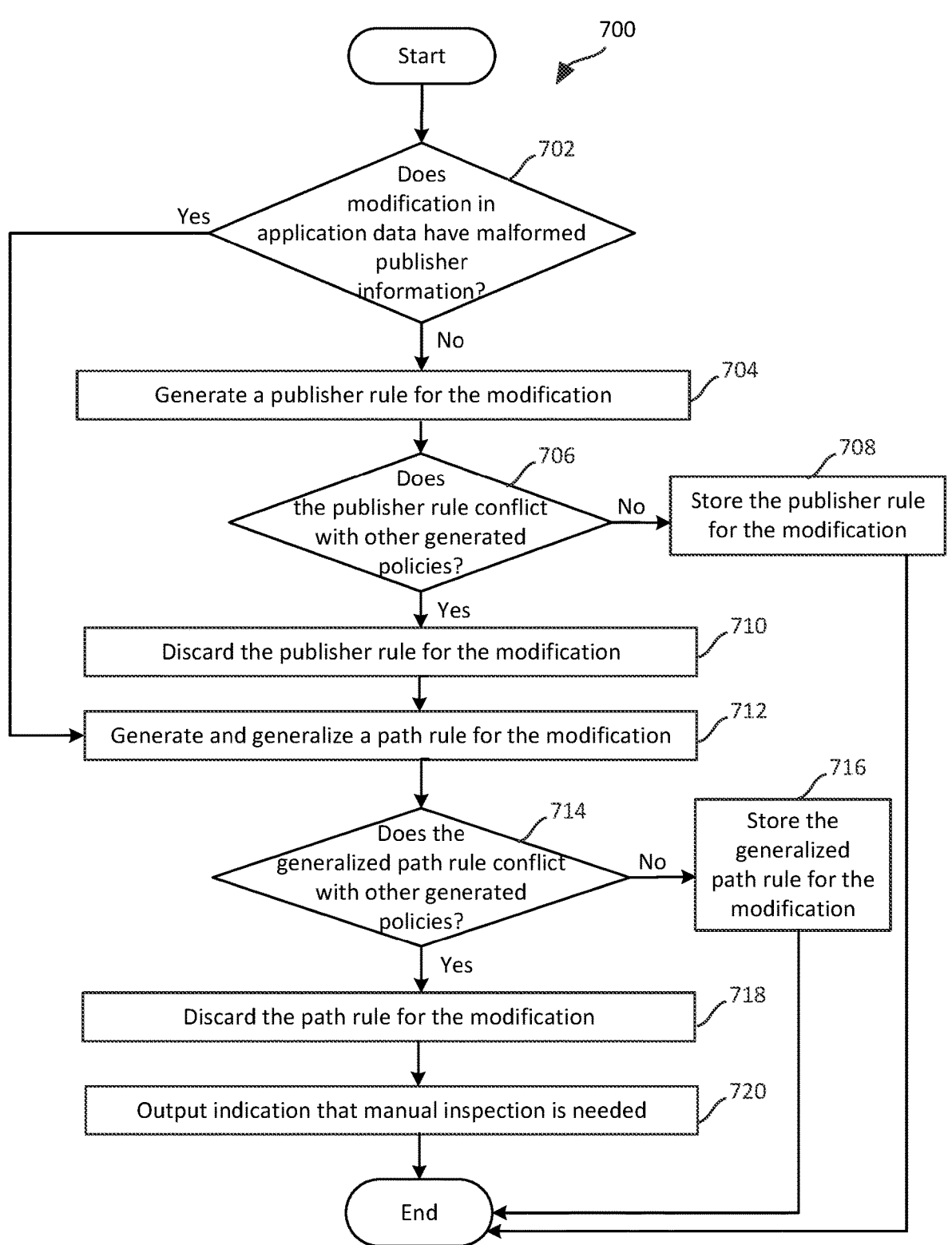
FIG. 7 is a flowchart of an example routine that may be performed by a policy generator according to an example implementation of the system shown in FIG. 6.

FIG. 7 illustrates an example routine 700 that may be performed by the policy generator 630 to generate a rule for individual modifications per application. At a decision step 702 of the routine 700, the policy generator 630 may determine whether a modification in the application data 616, for the particular application, has malformed publisher information. The policy generator 630 may use the policy configuration settings that includes expressions representing malformed publisher information, and may determine whether the modification is a file path including malformed publisher information. If the modification in the application data 616 includes malformed publisher information, then the routine 700 may proceed to a step 712 to generate a path rule (as described below).

If the application data 616 does not include malformed publisher information (as determined at the decision step 702), then at a step 704 of the routine 700, the policy generator 630 may generate a publisher rule for the application. The publisher rule may allow or deny execution of the application based on whether the application access indicator 106 indicates whether the application is authorized or unauthorized.

At a decision step 706, the policy generator 630 may determine whether the publisher rule conflicts with other generated policies. The other generated policies may be individual policies generated by the policy generator 630 for the applications that were installed at the application installer monitor(s) 615. Such policies, as described herein, may be generated by the policy generator 630 by processing the respective application data 616 and the application access indicator(s) 106. A publisher rule may conflict with other generated policies if it enables execution of an unauthorized application or disables execution of an authorized application. A publisher rule may conflict with other generated policies if it covers a file/data used for execution of another application. If the publisher rule does not conflict with the other generated policies, then at a step 708, the policy generator 630 may store the publisher rule for the modification. In some implementations, the publisher rule may be associated with the application, for example, using an application name.

After the step 708, the routine 700 may end. The policy generator 630 may then start the routine 700 to evaluate the next modification included in the application data 616 for this application, or to evaluate application data 616 for another application, and attempt to generate a rule for the next modification or the other application.

If the publisher rule conflicts with the other generated policies (as determined at the decision step 706), then at a step 710, the policy generator 630 may discard the publisher rule for the modification. At a step 712 of the routine 700, the policy generator 630 may generate and generalize a path rule for the modification. The path rule may, for example, be based on the file path included in the modification. The path rule may allow or deny access to the file path based on whether the application access indicator 106 indicates whether the application is authorized or unauthorized. The policy generator 630 may generalize the path rule by, for example, removing version information, if any is included, from the path rule or by referring to an ancestor directory instead.

At a decision step 714 of the routine 700, the policy generator 630 may determine whether the generalized path rule conflicts with the other generated policies, which may involve similar processing as described above in relation to the decision step 706. If the generalized path rule does not conflict with the other generated policies, then at a step 716, the policy generator 630 may store the generalized path rule for the modification. In some implementations, the path rule may be associated with the application, for example, using an application name.

After the step 716, the routine 700 may end. The policy generator 630 may then start the routine 700 to evaluate the next modification included in the application data 616 for this application, or to evaluate application data 616 for another application, and attempt to generate a rule for the next modification or the other application.

If the generalized path rule conflicts with the other generated policies (as determined at the decision step 714), then at a step 718, the policy generator 630 may discard the generalized path rule for the modification. At a step 720 of the routine 700, the policy generator 630 may output the indication that manual inspection is needed. The indication may be sent to the client device 104, and may be presented via a user interface at the client device 104. Along with the indication, the client device 104 may also receive and output data indicative of the application with the conflicting path rule, and/or may also receive and output data representing the conflicting path rule. At this point, the user 102 may manually set a policy for the particular application.

In some implementations, after the step 720, the routine 700 may end and the policy generator 630 may wait to receive input from the client device 104 to continue evaluation of the application data 616. In other implementations, after the step 720, the policy generator 630 may continue evaluating the application data 616 by executing the routine 700 with respect to other application data 616 or other modifications within the same application data 616.

In some implementations, if the generalized path rule (generated at the step 712) conflicts with the other generated policies, then the policy generator 630 may remove the generalizations from the path rule, and perform the decision step 714 with respect to the non-generalized path rule. If the non-generalized path rule conflicts with the other generated policies, then the policy generator 630 may discard the path rule per the step 718. If the non-generalized path rule does not conflict with the other generated policies, then the policy generator 630 may store the non-generalized path rule for the modification (in a similar manner as described with respect to the step 716).

In some implementations, based on performing the routine 700, the policy generator 630 may generate path rules for an application that is part of a framework application (e.g., part of Microsoft Office). For a framework application, publisher rules may conflict with the other applications included in the framework, and therefore, path rules may be used instead. Based on performing the decision step 706, the policy generator 630 may recognize that the publisher rule conflicts with another generated policy, and may generate and store a path rule for the application instead (e.g., according to the steps 710-716 of the routine 700). Moreover, the path rule for the framework application may be generalized if the generalized path rule does not conflict with policies for the other framework applications.

The policy generator 630 may be configured to optimize the individual policies for individual applications by eliminating duplicate rules, and eliminating rules that are subsets of other rules. For example, execution of the first and second applications may involve use of the same file/data, which may result in individual policies for the first and second applications to include the same/duplicative rules. To reduce the number of rules in the application policies 108, the policy generator 630 may delete one or more of the rules.

Additionally, the policy generator 630 may be configured to generalize path rules for applications that are installed (by the application installer monitor(s) 615) with version-dependent paths. For example, the policy generator 630 may remove version dependencies, version numbers, etc., from a path rule.

Below is an example of application policies 108 that may be generated by the policy generator 630.

```
<AppLockerPolicy Version="1">
    <RuleCollection Type="Appx" EnforcementMode="NotConfigured" />
    <RuleCollection Type="Dll" EnforcementMode="NotConfigured" />
    <RuleCollection Type="Exe" EnforcementMode="NotConfigured">
        <FilePublisherRule Id="fe09e051-20a0-5171-b39d-008d45949799" Name="
(WEBKIT2WEBPROCESS.EXE) - O=APPLE INC., L-CUPERTINO, S=CALIFORNIA,
C=US" Description="This rule affects the following applications: quicktime/7.79.80.95,
safari/5.1.7.2" UserOrGroupSid="S-1-1-0" Action="Deny">
            <Conditions>
                <FilePublisherCondition PublisherName="O=APPLE INC., L=CUPERTINO,
S=CALIFORNIA, C-US" ProductName=""
BinaryName="WEBKIT2WEBPROCESS.EXE">
                    <Binary VersionRange LowSection="*" HighSection="*" >
                </FilePublisherCondition>
            </Conditions>
        </FilePublisherRule>
        <FilePathRule Id="10492dd5-7606-5a8e-8340-d4b480d3bfe3"
Name="C:\Program Files (x86)\QuickTime\*" Description="This rule affects the following
applications: quicktime/7.79.80.95" UserOrGroupSid="S-1-1-0" Action="Deny">
            <Conditions>
                <FilePathCondition Path="C:\Program Files (x86)\QuickTime|*" >
            </Conditions>
        </FilePathRule>
        <FilePublisherRule Id="6315e106-a5fc-50ef-9c37-34dd03575b4e"
Name="QUICKTIME - O=APPLE INC., L-CUPERTINO, S=CALIFORNIA, C=US"
Description="This rule affects the following applications: quicktime/7.79.80.95"
UserOrGroupSid="S-1-1-0" Action="Deny">
            <Conditions>
                <FilePublisherCondition PublisherName="O=APPLE INC., L-CUPERTINO,
S=CALIFORNIA, C=US" ProductName="QUICKTIME" BinaryName="*">
```

-continued

```
        <Binary VersionRange LowSection="*" HighSection="*" >
      </FilePublisherCondition>
    </Conditions>
  </FilePublisherRule>
      <!-- -- >
  </RuleCollection>
  <RuleCollection Type="Msi" EnforcementMode="NotConfigured" />
  <RuleCollection Type="Script" EnforcementMode="NotConfigured" />
</AppLockerPolicy>
```

The above example is an application policy that can be used with AppLocker, which has been shortened for illustration purposes (the "<!-- . . . -->" will typically contain many more rules). The above example contains two publisher rules and one path rule; the first publisher rule will deny all executables with a PublisherName of "O=APPLE INC., L=CUPERTINO, S=CALIFORNIA, C=US", a Product-Name of the empty string, and a Binary Name of "WEBKIT2WEBPROCESS.EXE". The policy generator 630 added the names and versions of the affected applications as part of the rule description and for debugging purposes. The path rule will block all executables under the "C:\Program Files (x86)\QuickTime" folder, recursively. The second publisher rule will block all executable with a publisher name of "O=APPLE INC., L=CUPERTINO, S=CALIFORNIA, C=US", a ProductName of "QUICK-TIME", and any BinaryName.

In some implementations, the policy generator 630 may be configured to generate publisher rules rather than path rules. In some implementations, the policy generator 630 may be configured to generate path rules rather than publisher rules. In other implementations, the policy generator 630 may generate publisher rules and path rules.

To enforce a publisher rule, the files may need to be digitally signed by the publisher (vendor or otherwise provider) of the application. Alternatively, an internal certificate can be used. Publisher rules that are specified to the version level may have to be updated when a new version of the file is released. A path rule can be assigned to any file; however, because path rules specify locations within the file system, any subdirectory may also be affected by the rule (unless explicitly exempted).

In some implementations, the policy generator 630 may be configured to avoid generating file hash rules. File hash rules are the most precise rules, but are only usable for files/data that are never or rarely updated (e.g., for an application that is no longer supported). Any file can be assigned a file hash rule condition; however, the file hash rule needs to be updated each time a new version of the file is released because the hash value is based in part upon the version.

The policy generator 630 may also be configured to handle conflicts between policies for authorized applications and unauthorized applications. In an example, if the first application is authorized and the second application is unauthorized, and execution of the first and second applications involve use of the same file/data, then the individual policies for the first and second applications may be in conflict. Keeping the individual policies may result in blocking/disabling of the authorized first application, or may result in allowing/enabling of the unauthorized second application. To avoid this outcome, the policy generator 630 may resolve the conflict between the individual policies, so that the authorized first application is enabled and the unauthorized second application is disabled.

In some implementations, the policy generator 630 may be configured to generate rules for executable files for native applications, and may not generate rules for operating system (e.g., Windows) installer files, scripts, packaged applications, packaged application installers, or DLLs. The executable files may have a particular file extension, such as .exe, .com, etc.

The application policies 108 may be one or more policy files that may be deployed via Microsoft Active Directory group policy objects (GPOs) or other equivalents for other operating systems. The application policies 108 may include a base policy file containing rules for applications that are denied unconditionally, with no exceptions, rules to inhibit/prevent an application (execution or installation) from bypassing an application control mechanism, and rules for applications that are to be allowed-by-default.

The application policies 108 may further include a policy file for the rules (generated by the policy generator 630) to be enforced. In some implementations, the application policies 108 may include a policy file for the rules to be in audit-only mode, which may be used by client devices 202 where the application control mechanism cannot be enforced/used yet. The application policies 108 may include a policy file for all applications that are to be denied by default, with exceptions permitted. The application policies 108 may also include a set of policy files that each contains one application to be denied by default, which can be selectively applied in order to allow execution of applications for which exceptions have been granted. Either a subset of these policy files or the "policy file for all applications to be denied by default" are to be applied for any given client device 202.

After the application policies 108 have been generated, the computing system(s) 100 may test the policies to confirm that the applications launch correctly in accordance with the policy. For example, the application policies 108 may be deployed at one or more test devices/environments, such as a computing system, a virtual machine, a client device 202 or another computing system (which may be included in the computing system(s) 100 or may be external to the computing system(s) 100). Such test device/environment may include an application control mechanism (e.g., AppLocker, Google Santa, Workspace Environment Manager, etc.). After deploying the application policies 108, one or more applications may be installed and launched at the test device/environment. The test device/environment may include a monitoring component that may track data indicative of which applications were allowed to install and/or execute, and which application were blocked. Such a monitoring component may be part of the existing application control mechanism. Based on which applications are allowed and which are blocked at the test device/environment and based on the application access indicator(s) 106, the computing system(s) 100 may determine whether the application policies 108 are accurate.

When an application is updated (e.g., by the publisher), the application installer monitor(s) 615 can again be used (at the request of an administrator or otherwise) to install the updated application, determine modifications occurring based on the updated application, and generate updated application policies 108. In some implementations, in such cases, the policy generator 630 may use previously generated application policies 108, and may update them based on the updated application. In some cases, updates to the application may not result in any changes in how it is installed or may not result in changes in the application policy (e.g., a new version of the application may not result in any changes in the digital signatures relevant for generating application policies). The policy generator 630 may be configured to identify such cases.

When an application access status is updated (e.g., by an administrator), the policy generator 630 can again be run (at the request of an administrator or otherwise) to generate updated policies. In some implementations, the policy generator 630 may use the previously generated application policies 108, and may update them based on the updated application access status. In other implementations, the computing system(s) 100 may evaluate installation of the applications, to be used at the client device 202 subjected to the updated application access status, and may generate application policies 108 using the updated application access status, which may be provided as the application access indicator(s) 106.

The techniques described herein can be used to evaluate a large number of applications that are to be used at the client device 202 subject to an organization control policy. The application policies generated as described herein can be used to control applications to be installed at the client device 202, and also to control applications that may have already been installed at the client device 202. The techniques described herein can also be used for devices where only a few applications are installed, and where installation of further applications is not permitted. Such devices can include kiosks, other types of devices that shared by multiple people, servers to which only administrators have interactive access, etc. Application control may already be enforced on the devices. Using the techniques described herein, a more precise and resilient (e.g., against application updates) application control policy may be deployed.

G. Example Implementations of Methods, Systems, and Computer-Readable Media in Accordance with the Present Disclosure The following paragraphs (M1) through (M9) describe examples of methods that may be implemented in accordance with the present disclosure.

(M1) A method may be performed that involves causing, by a computing system, installation of at least a first application and a second application, determining, by the computing system, first application data indicative of modifications occurring in response to installation of the first application, determining, by the computing system, second application data indicative of modifications occurring in response to installation of the second application, and processing the first application data and the second application data to generate a set of application policies to control use of the first application and the second application at a user device.

(M2) A method may be performed as described in paragraph (M1), and may further involve processing the first application data and an input representing that the user device is to be allowed to access the first application to generate a first application policy to control use of the first application, processing the second application data and an input representing that the user device is to be prevented from accessing the second application to generate a second application policy to control use of the second application, and processing the first application policy with respect to the second application policy to generate the set of application policies.

(M3) A method may be performed as described in paragraph (M1) or paragraph (M2), and may further involve processing the first application data to generate a first application policy to control use of the first application, processing the second application data to generate a second application policy to control use of the second application, determining a conflict between the first application policy and the second application policy, and based at least in part on determining the conflict, discarding the first application policy and the second application policy.

(M4) A method may be performed as described in any of paragraphs (M1) through (M3), and may further involve processing the first application data to generate a first application policy to control use of the first application, processing the second application data to generate a second application policy to control use of the second application, determining a duplicate among the first application policy and the second application policy, and generating the set of application policies to include the first application policy.

(M5) A method may be performed as described in any of paragraphs (M1) through (M4), and may further involve receiving, by the computing system and from a client device, an input indicative of the first application and the second application, and in response to receiving the input, causing, by the computing system, installation of the first application and the second application.

(M6) A method may be performed as described in any of paragraphs (M1) through (M5), and may further involve determining, by the computing system, that an updated version of the first application is available, causing, by the computing system, installation of the updated version of the first application, determining, by the computing system, updated application data indicative of modifications occurring in response to installation of the updated version of the first application, processing, by the computing system, the updated application data to determine a second application policy to control use of the updated version of the first application, and determining, by the computing system, updated set of application policies based at least in part on the first application policy and the second application policy.

(M7) A method may be performed as described in any of paragraphs (M1) through (M6), and may further involve causing, by the computing system, installation of the first application on a first computing device, causing, by the computing system, installation of the second application on a second computing device, and after determining the first application data, resetting the first computing device to enable installation of an additional application.

(M8) A method may be performed as described in any of paragraphs (M1) through (M7), and may further involve after generating the set of application policies, sending data representing the set of application policies to a computing device, causing, by the computing device, installation and launch of at least the first application and the second application, and determining that the set of application policies controlled use of the first application and the second application at the computing device in accordance with stored application access indicators.

(M9) A method may be performed as described in any of paragraphs (M1) through (M8), and may further involve causing, by the computing system, installation of a third application, determining, by the computing system, third application data indicative of modifications occurring in response to installation of the third application, processing, by the computing system, the third application data to generate a publisher rule to control use of the third application, determining, by the computing system, that the publisher rule is in conflict with the set of application policies, and determining, by the computing system, a path rule, instead of the publisher rule, to control use of the third application, the path rule to be included in the set of application policies.

The following paragraphs (S1) through (S9) describe examples of systems and devices that may be implemented in accordance with the present disclosure.

(S1) A system may comprise at least one processor and at least one computer-readable medium encoded with instructions which, when executed by the at least one processor, cause the system to cause installation of at least a first application and a second application, determine first application data indicative of modifications occurring in response to installation of the first application, determine second application data indicative of modifications occurring in response to installation of the second application, and process the first application data and the second application data to generate a set of application policies to control use of the first application and the second application at a user device.

(S2) A system may be configured as described in paragraph (S1), wherein the at least one computer-readable medium may be further encoded with additional instructions which, when executed by the at least one processor, further cause the system to process the first application data and an input representing that the user device is to be allowed to access the first application to generate a first application policy to control use of the first application, process the second application data and an input representing that the user device is to be prevented from accessing the second application to generate a second application policy to control use of the second application, and process the first application policy with respect to the second application policy to generate the set of application policies.

(S3) A system may be configured as described in paragraph (S1) or paragraph (S2), wherein the at least one computer-readable medium may be further encoded with additional instructions which, when executed by the at least one processor, further cause the system to process the first application data to generate a first application policy to control use of the first application, process the second application data to generate a second application policy to control use of the second application, determine a conflict between the first application policy and the second application policy, and based at least in part on determining the conflict, discard the first application policy and the second application policy.

(S4) A system may be configured as described in any of paragraphs (S1) through (S3), wherein the at least one computer-readable medium is further encoded with additional instructions which, when executed by the at least one processor, further cause the system to process the first application data to generate a first application policy to control use of the first application, process the second application data to generate a second application policy to control use of the second application, determine a duplicate among the first application policy and the second application policy, and generate the set of application policies to include the first application policy.

(S5) A system may be configured as described in any of paragraphs (S1) through (S4), wherein the at least one computer-readable medium is further encoded with additional instructions which, when executed by the at least one processor, further cause the system to receive, from a client device, an input indicative of the first application and the second application, and in response to receiving the input, cause installation of the first application and the second application.

(S6) A system may be configured as described in any of paragraphs (S1) through (S5), wherein the set of application policies includes a first application policy to control use of the first application at the user device, and wherein the at least one computer-readable medium is further encoded with additional instructions which, when executed by the at least one processor, further cause the system to determine that an updated version of the first application is available, cause installation of the updated version of the first application, determine updated application data indicative of modifications occurring in response to installation of the updated version of the first application, process the updated application data to determine a second application policy to control use of the updated version of the first application, and determine updated set of application policies based at least in part on the first application policy and the second application policy.

(S7) A system may be configured as described in any of paragraphs (S1) through (S6), wherein the at least one computer-readable medium is further encoded with additional instructions which, when executed by the at least one processor, further cause the system to cause installation of the first application on a first computing device, cause installation of the second application on a second computing device, and after determining the first application data, reset the first computing device to enable installation of an additional application.

(S8) A system may be configured as described in any of paragraphs (S1) through (S7), wherein the at least one computer-readable medium is further encoded with additional instructions which, when executed by the at least one processor, further cause the system to after generating the set of application policies, send data representing the set of application policies to a computing device, cause, by the computing device, installation and launch of at least the first application and the second application, and determine that the set of application policies controlled use of the first application and the second application at the computing device in accordance with stored application access indicators.

(S9) A system may be configured as described in any of paragraphs (S1) through (S8), wherein the at least one computer-readable medium is further encoded with additional instructions which, when executed by the at least one processor, further cause the system to cause installation of a third application, determine third application data indicative of modifications occurring in response to installation of the third application, process the third application data to generate a publisher rule to control use of the third application, determine that the publisher rule is in conflict with the set of application policies, and determine a path rule, instead of the publisher rule, to control use of the third application, the path rule to be included in the set of application policies.

The following paragraphs (CRM1) through (CRM9) describe examples of computer-readable media that may be implemented in accordance with the present disclosure.

(CRM1) At least one non-transitory computer-readable medium may be encoded with instructions which, when executed by at least one processor of a system, may cause the system to cause installation of at least a first application and a second application, determine first application data indicative of modifications occurring in response to installation of the first application, determine second application data indicative of modifications occurring in response to installation of the second application, and process the first application data and the second application data to generate a set of application policies to control use of the first application and the second application at a user device.

(CRM2) At least one non-transitory computer-readable medium may be configured as described in paragraph (CRM1), and may be further encoded with additional instructions which, when executed by the at least one processor, further cause the system to process the first application data and an input representing that the user device is to be allowed to access the first application to generate a first application policy to control use of the first application, process the second application data and an input representing that the user device is to be prevented from accessing the second application to generate a second application policy to control use of the second application, and process the first application policy with respect to the second application policy to generate the set of application policies.

(CRM3) At least one non-transitory computer-readable medium may be configured as described in paragraph (CRM1) or paragraph (CRM2), and may be further encoded with additional instructions which, when executed by the at least one processor, further cause the system to process the first application data to generate a first application policy to control use of the first application, process the second application data to generate a second application policy to control use of the second application, determine a conflict between the first application policy and the second application policy, and based at least in part on determining the conflict, discard the first application policy and the second application policy.

(CRM4) At least one non-transitory computer-readable medium may be configured as described in any of paragraphs (CRM1) through (CRM3), and may be further encoded with additional instructions which, when executed by the at least one processor, further cause the system to process the first application data to generate a first application policy to control use of the first application, process the second application data to generate a second application policy to control use of the second application, determine a duplicate among the first application policy and the second application policy, and generate the set of application policies to include the first application policy.

(CRM5) At least one non-transitory computer-readable medium may be configured as described in any of paragraphs (CRM1) through (CRM4), and may be further encoded with additional instructions which, when executed by the at least one processor, further cause the system to receive, from a client device, an input indicative of the first application and the second application, and in response to receiving the input, cause installation of the first application and the second application.

(CRM6) At least one non-transitory computer-readable medium may be configured as described in any of paragraphs (CRM1) through (CRM5), wherein the set of application policies includes a first application policy to control use of the first application at the user device, and the at least one non-transitory computer-readable medium may be further encoded with additional instructions which, when executed by the at least one processor, further cause the system to determine that an updated version of the first application is available, cause installation of the updated version of the first application, determine updated application data indicative of modifications occurring in response to installation of the updated version of the first application, process the updated application data to determine a second application policy to control use of the updated version of the first application, and determine updated set of application policies based at least in part on the first application policy and the second application policy.

(CRM7) At least one non-transitory computer-readable medium may be configured as described in any of paragraphs (CRM1) through (CRM6), and may be further encoded with additional instructions which, when executed by the at least one processor, further cause the system to cause installation of the first application on a first computing device, cause installation of the second application on a second computing device, and after determining the first application data, reset the first computing device to enable installation of an additional application.

(CRM8) At least one non-transitory computer-readable medium may be configured as described in any of paragraphs (CRM1) through (CRM7), and may be further encoded with additional instructions which, when executed by the at least one processor, further cause the system to after generating the set of application policies, send data representing the set of application policies to a computing device, cause, by the computing device, installation and launch of at least the first application and the second application, and determine that the set of application policies controlled use of the first application and the second application at the computing device in accordance with stored application access indicators.

(CRM9) At least one non-transitory computer-readable medium may be configured as described in any of paragraphs (CRM1) through (CRM8), and may be further encoded with additional instructions which, when executed by the at least one processor, further cause the system to cause installation of a third application, determine third application data indicative of modifications occurring in response to installation of the third application, process the third application data to generate a publisher rule to control use of the third application, determine that the publisher rule is in conflict with the set of application policies, and determine a path rule, instead of the publisher rule, to control use of the third application, the path rule to be included in the set of application policies.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:

causing, by a computing system, installation of at least a first application and a second application at a user device, wherein the first application is installed by a first application installer and the second application is installed using a second application installer;

monitoring, using a first application installer monitor, the installation of the first application at the user device;

generating, by the first application installer monitor, first application data indicative of first modifications occurring in response to installation of the first application, wherein the first modifications comprise at least a first downloaded file comprising a first filename and a first file path of the first downloaded file, in which the first file path indicates a location of the first downloaded file in memory of the user device;

monitoring, using a second application installer monitor, the installation of the second application at the user device;

generating, by the second application installer monitor, second application data indicative of second modifications occurring in response to installation of the second application, wherein the second modifications comprise at least a second downloaded file comprising a second filename and a second file path of the second downloaded file, in which the second file path indicates a location of the second downloaded file in memory of the user device;

storing, at an application installation repository, the first application data and the second application data;

resetting after the storing, the first application installer monitor, wherein the resetting the first application installer monitor comprises:

deleting the first application data from memory associated with the first application installer monitor; and restoring an operating system of the first application installer monitor, wherein resetting the first application installer monitor readies the first application installer monitor for future application installations;

resetting after the storing, the second application installer monitor, wherein the resetting the second application installer monitor comprises:

deleting the second application data from memory associated with the second application installer monitor; and restoring an operating system of the second application installer monitor, wherein resetting the second application installer monitor readies the second application installer monitor for the future application installations;

extracting, from the application installation repository and by a policy generator, the first application data and the second application data; and processing, by the policy generator, the first application data and the second application data to generate a set of application policies to control use of the first application and the second application at the user device, wherein one or more policy configuration settings, stored in memory of the policy generator, are used to generate the set of application policies.

2. The method of claim 1, further comprising:

processing the first application data and an input representing that the user device is to be allowed to access the first application to generate a first application policy to control use of the first application;

processing the second application data and an input representing that the user device is to be prevented from accessing the second application to generate a second application policy to control use of the second application; and processing the first application policy with respect to the second application policy to generate the set of application policies.

3. The method of claim 1, further comprising:

processing the first application data to generate a first application policy to control use of the first application;

processing the second application data to generate a second application policy to control use of the second application;

determining a conflict between the first application policy and the second application policy; and based at least in part on determining the conflict, discarding the first application policy and the second application policy.

4. The method of claim 1, further comprising:

processing the first application data to generate a first application policy to control use of the first application;

processing the second application data to generate a second application policy to control use of the second application;

determining a duplicate among the first application policy and the second application policy; and generating the set of application policies to include the first application policy.

5. The method of claim 1, further comprising:

receiving, by the computing system and from a client device, an input indicative of the first application and the second application; and in response to receiving the input, causing, by the computing system, installation of the first application and the second application.

6. The method of claim 1, wherein the set of application policies includes a first application policy to control use of the first application at the user device, and the method further comprises:

determining, by the computing system, that an updated version of the first application is available;

causing, by the computing system, installation of the updated version of the first application;

determining, by the computing system, updated application data indicative of modifications occurring in response to installation of the updated version of the first application;

processing, by the computing system, the updated application data to determine a second application policy to control use of the updated version of the first application; and determining, by the computing system, updated set of application policies based at least in part on the first application policy and the second application policy.

7. The method of claim 1, further comprising:

causing, by the computing system, installation of the first application on a first computing device;

causing, by the computing system, installation of the second application on a second computing device; and after determining the first application data, resetting the first computing device to enable installation of an additional application.

8. The method of claim 1, further comprising:

after generating the set of application policies, sending data representing the set of application policies to a computing device;

causing, by the computing device, installation and launch of at least the first application and the second application; and determining that the set of application policies controlled use of the first application and the second application at the computing device in accordance with stored application access indicators.

9. The method of claim 1, further comprising:

causing, by the computing system, installation of a third application;

determining, by the computing system, third application data indicative of modifications occurring in response to installation of the third application;

processing, by the computing system, the third application data to generate a publisher rule to control use of the third application;

determining, by the computing system, that the publisher rule is in conflict with the set of application policies; and determining, by the computing system, a path rule, instead of the publisher rule, to control use of the third application, the path rule to be included in the set of application policies.

10. A system, comprising:

at least one processor; and at least one computer-readable medium encoded with instructions which, when executed by the at least one processor, cause the system to:

cause installation of at least a first application and a second application at a user device, wherein the first application is installed by a first application installer and the second application is installed using a second application installer, monitor, using a first application installer monitor, the installation of the first application at the user device, generate, by the first application installer monitor, first application data indicative of first modifications occurring in response to installation of the first application, wherein the first modifications comprise at least a first downloaded file comprising a first filename and a first file path of the first downloaded file, in which the first file path indicates a location of the first downloaded file in memory of the user device, monitor, using a second application installer monitor, the installation of the second application at the user device;

generate, by the second application installer monitor, second application data indicative of second modifications occurring in response to installation of the second application, wherein the second modifications comprise at least a second downloaded file comprising a second filename and a second file path of the second downloaded file, in which the second file path indicates a location of the second downloaded file in memory of the user device, store, at an application installation repository, the first application data and the second application data, reset, after the storing, the first application installer monitor, wherein the resetting the first application installer monitor comprises:

deleting the first application data from memory associated with the first application installer monitor; and restoring an operating system of the first application installer monitor, wherein resetting the first application installer monitor readies the first application installer monitor for future application installations;

reset, after the storing, the second application installer monitor, wherein the resetting the second application installer monitor comprises:

deleting the second application data from memory associated with the second application installer monitor; and restoring an operating system of the second application installer monitor, wherein resetting the second application installer monitor readies the second application installer monitor for the future application installations;

extract, from the application installation repository and by a policy generator, the first application data and the second application data process, by the policy generator, the first application data and the second application data to generate a set of application policies to control use of the first application and the second application at the user device, wherein one or more policy configuration settings, stored in memory of the policy generator, are used to generate the set of application policies.

11. The system of claim 10, wherein the at least one computer-readable medium is further encoded with additional instructions which, when executed by the at least one processor, further cause the system to:

process the first application data and an input representing that the user device is to be allowed to access the first application to generate a first application policy to control use of the first application;

process the second application data and an input representing that the user device is to be prevented from accessing the second application to generate a second application policy to control use of the second application; and process the first application policy with respect to the second application policy to generate the set of application policies.

12. The system of claim 10, wherein the at least one computer-readable medium is further encoded with additional instructions which, when executed by the at least one processor, further cause the system to:

process the first application data to generate a first application policy to control use of the first application;

process the second application data to generate a second application policy to control use of the second application;

determine a conflict between the first application policy and the second application policy; and based at least in part on determining the conflict, discard the first application policy and the second application policy.

13. The system of claim 10, wherein the at least one computer-readable medium is further encoded with additional instructions which, when executed by the at least one processor, further cause the system to:

process the first application data to generate a first application policy to control use of the first application;

process the second application data to generate a second application policy to control use of the second application;

determine a duplicate among the first application policy and the second application policy; and generate the set of application policies to include the first application policy.

14. The system of claim 10, wherein the at least one computer-readable medium is further encoded with additional instructions which, when executed by the at least one processor, further cause the system to:

receive, from a client device, an input indicative of the first application and the second application; and in response to receiving the input, cause installation of the first application and the second application.

15. The system of claim 10, wherein the set of application policies includes a first application policy to control use of the first application at the user device, and wherein the at least one computer-readable medium is further encoded with additional instructions which, when executed by the at least one processor, further cause the system to:

determine that an updated version of the first application is available;

cause installation of the updated version of the first application;

determine updated application data indicative of modifications occurring in response to installation of the updated version of the first application;

process the updated application data to determine a second application policy to control use of the updated version of the first application; and determine updated set of application policies based at least in part on the first application policy and the second application policy.

16. The system of claim 10, wherein the at least one computer-readable medium is further encoded with additional instructions which, when executed by the at least one processor, further cause the system to:

cause installation of the first application on a first computing device;

cause installation of the second application on a second computing device; and after determining the first application data, reset the first computing device to enable installation of an additional application.

17. The system of claim 10, wherein the at least one computer-readable medium is further encoded with additional instructions which, when executed by the at least one processor, further cause the system to:

after generating the set of application policies, send data representing the set of application policies to a computing device;

cause, by the computing device, installation and launch of at least the first application and the second application; and determine that the set of application policies controlled use of the first application and the second application at the computing device in accordance with stored application access indicators.

18. The system of claim 10, wherein the at least one computer-readable medium is further encoded with additional instructions which, when executed by the at least one processor, further cause the system to:

cause installation of a third application;

determine third application data indicative of modifications occurring in response to installation of the third application;

process the third application data to generate a publisher rule to control use of the third application;

determine that the publisher rule is in conflict with the set of application policies; and determine a path rule, instead of the publisher rule, to control use of the third application, the path rule to be included in the set of application policies.

19. At least one non-transitory computer-readable medium encoded with instructions which, when executed by at least one processor of a system, cause the system to:

cause installation of at least a first application and a second application at a user device, wherein the first application is installed by a first application installer and the second application is installed using a second application installer;

monitor, using a first application installer monitor, the installation of the first application;

generate, by the first application installer monitor, first application data indicative of first modifications occurring in response to installation of the first application, wherein the first modifications comprise at least a first downloaded file comprising a first filename and a first file path of the first downloaded file, in which the first file path indicates a location of the first downloaded file in memory of the user device;

monitor, using a second application installer monitor, the installation of the second application;

generate, by the second application installer, second application data indicative of second modifications occurring in response to installation of the second application, wherein the second modifications comprise at least a second downloaded file comprising a second filename and a second file path of the second downloaded file, in which the second file path indicates a location of the second downloaded file in memory of the user device;

store, at an application installation repository, the first application data and the second application data;

reset, after the storing, the first application installer monitor, wherein the resetting the first application installer monitor comprises:

deleting the first application data from memory associated with the first application installer monitor; and restoring an operating system of the first application installer monitor, wherein resetting the first application installer monitor readies the first application installer monitor for future application installations;

reset, after the storing, the second application installer monitor, wherein the resetting the second application installer monitor comprises:

deleting the second application data from memory associated with the second application installer monitor; and restoring an operating system of the second application installer monitor, wherein resetting the second application installer monitor readies the second application installer monitor for the future application installations;

extract, from the application installation repository and by a policy generator, the first application data and the second application data; and process, by the policy generator, the first application data and the second application data to generate a set of application policies to control use of the first application and the second application at a user device, wherein one or more policy configuration settings, stored in memory of the policy generator, are used to generate the set of application policies.

20. The at least one non-transitory computer-readable medium of claim 19, further encoded with additional instructions which, when executed by the at least one processor, further cause the system to:

process the first application data and an input representing that the user device is to be allowed to access the first application to generate a first application policy to control use of the first application;

process the second application data and an input representing that the user device is to be prevented from accessing the second application to generate a second application policy to control use of the second application; and process the first application policy with respect to the second application policy to generate the set of application policies.

\* \* \* \* \*